Oct. 24, 1967  C. C. BELL  3,349,301

HIGH SPEED OPEN CAPACITANCE PROBE FOR FUEL SYSTEMS

Filed Oct. 13, 1964  3 Sheets-Sheet 1

INVENTOR

BY *Charles C. Bell*
*Edwin E. Greigg*
ATTORNEY

INVENTOR
Charles C. Bell
BY Edwin E. Greigg
ATTORNEY

Oct. 24, 1967  C. C. BELL  3,349,301
HIGH SPEED OPEN CAPACITANCE PROBE FOR FUEL SYSTEMS
Filed Oct. 13, 1964  3 Sheets-Sheet 3
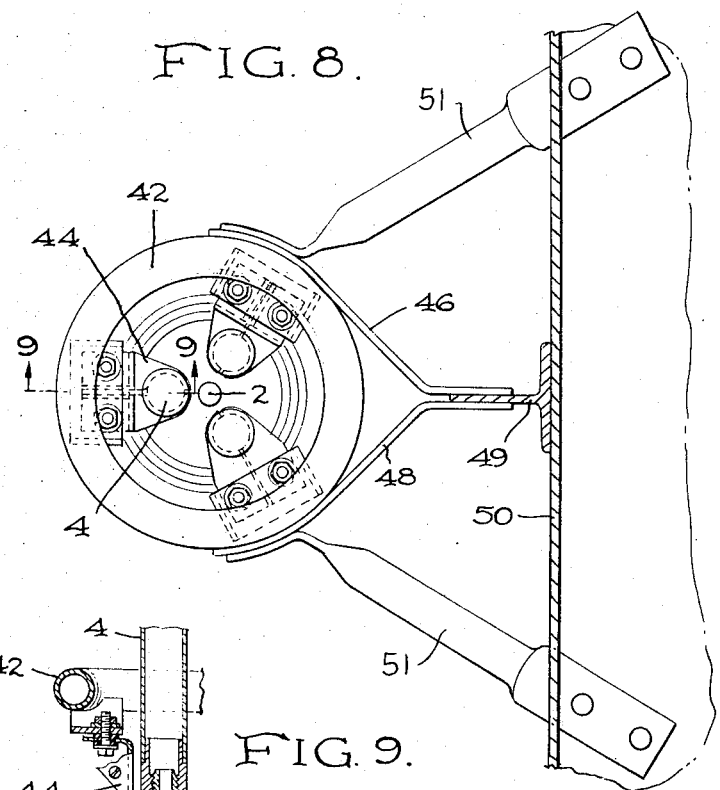
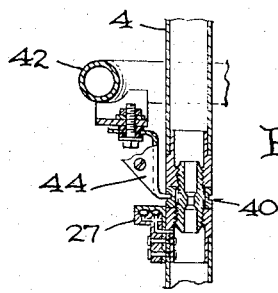
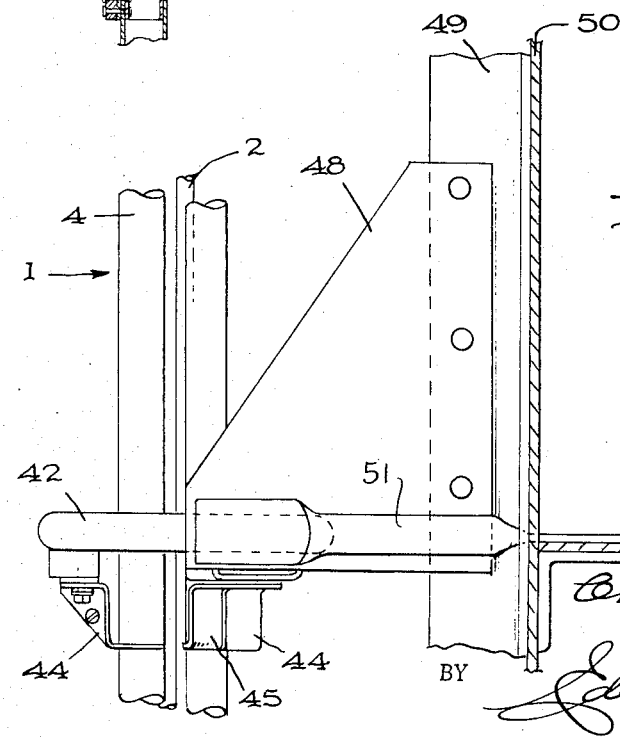
INVENTOR
Charles C. Bell
BY
Edwin E. Greigg
ATTORNEY United States Patent Office 3,349,301
Patented Oct. 24, 1967

3,349,301
HIGH SPEED OPEN CAPACITANCE PROBE
FOR FUEL SYSTEMS
Charles C. Bell, Croton, N.Y., assignor to Simmonds Precision Products, Inc., Tarrytown, N.Y., a corporation of New York
Filed Oct. 13, 1964, Ser. No. 403,497
8 Claims. (Cl. 317—246)

The present invention relates to the gauging of fuel in aircraft and missile applications, and more particularly the measurement of a liquid level which is rising or falling at a high rate of speed.

A fundamental problem in the design of liquid level measuring systems in space vehicles is to achieve a capacitance measuring probe that can follow within $\frac{1}{10}$ of an inch liquid level changes as rapid as 120 inches per second. This accuracy requirement of approximately 1 part in 5,000 exceeds the present state of the art for a single probe measurement. Conventional design techniques used in the gauging of fuel in space vehicle applications become marginal at these extremely high speeds. The probe design must be such that substantial spacing between electrodes exists in order that no fluid is trapped inside the probe itself when the tank level is rising or falling at a high rate of speed. The conventional parallel plate arrangement does not offer the required spacing between electrodes and hence cannot accurately follow a level moving at the specified rate. Further, investigations have revealed that a formation of vapor bubbles occur at the capacitor surfaces due to heat transfer from hot ullage gases. Experiments in liquid nitrogen with ullage gases at temperatures much lower than 20° C. show that a significant amount of vapor bubble formation occurs. Thus, there is significant collection of bubbles in the region between the plates and the parallel plate capacitor which would greatly impair the accuracy of reproducability of any level measurements. Bubbling around the sensor would result in the sensor not taking any representative fluid samples. In attempting to overcome these problems a capacitive probe comprising a single pair of concentric cylinders has been employed in the past with reasonable satisfaction. One advantage of this design is the minimizing of the variation in capacitance between the electrodes due to mechanical shifting of one electrode relative to the other. This design is the best practical capacitor embodiment for liquid level measurement so far as maintaining constant capacitance between shifting electrodes is concerned. For example, the center conductor can be displaced from its original setting a substantial distance before the measured capacity between the two cylinders changes. This is due to the naturally compensating geometry of the design. As the center electrode moves laterally, the added capacity in the direction of motion is compensated by the diminished capacity opposite to the direction of motion. This concentric design is relatively insensitive to stray fields, that is, electrostatic shielding, as well as change in capacitance with respect to height; it can be constructed to be extremely uniform in capacitance per unit length.

The general mechanical properties of the concentric design as far as vibration and shock, ease of construction and rounding of point sensors and the strength-to-weight ratio are also very good. The basic problem, however, in this design is the limitation on the speed of response. That is, its ability to follow liquid level changes at the rate of 120 inches per second with an error of not exceeding $\frac{1}{10}$ of an inch. To increase the speed of response of this probe geometry, it is necessary to increase the inner electrode's distance and, more importantly, to open up the outer cylinder. When enough openings have been provided in the outer cylinder, a point arises where this concentric structure can respond at the rate of 120 inches per second. In removing, therefore, a substantial portion of the outer electrode metal in order to achieve the high speed of operation, the strength of the outer member or electrode diminishes proportionately, and the ability to withstand vibration without any change in capacitance, as well as rough handling, diminishes to the point of being unusable.

Accordingly, it is an object of the present invention to provide a capacitance probe column having a very high speed of operation.

It is another object of this invention to provide a capacitance probe having a very high strength-to-weight ratio wherein the mechanical support for the entire structure is accomplished by the electrode assembly itself.

It is still yet another object of this invention to provide a capacitance probe column which is relatively insensitive to shift between electrodes.

It is still another object of this invention to provide a capacitance column probe exhibiting a uniformity of capacitance over a given unit length of probe height.

Still another object of this invention is to provide a capacitance column probe which allows for rapid removal and replacement of probe segments.

Still another object of this invention is to provide a capacitance probe employing an open structure to prevent bubble formation entrapment.

It is also an object of this invention to provide a capacitance probe which eliminates temperature gradient in the submerged probe portion and also maintains metal surfaces at cyrogenic temperatures for an appreciable time after they have emerged from the liquid surface.

The foregoing objects are realized in accordance with the principles of this invention by providing an open structure utilizing a cluster of four parallel, cylindrical, non-concentric tubes extending the length of the fuel tank in the space vehicle. The cluster comprises three external cylindrical electrodes which form one plate of the capacitor symmetrically arranged about the center electrode. The mechanical support for the entire structure is accomplished by the three outer electrodes all electrically held at the same potential and running the height of the tank. This geometry combines for very high speed of operation possible with the open wire structure of the conventional concentric tubular structure and, at the same time, has a very high strength-to-weight ratio not offered by the latter mentioned structures. With the inner electrode insulated from the three outer electrodes, the capacitance is then measured between the inner and outer electrodes. The three outer electrodes are welded together and a connection to the shield of center electrode is brought out directly through the wall of one of the outer electrodes. The probe column is made up of segments of equal length with a capacitance point sensor located at the top of each probe segment. The sensor is extremely simple and rugged in design and requires simply two concentric metal rings which connect through to one of the electrodes. The cables and harness supports therefor are constructed independently of the probe assembly to thereby allow for rapid removal and replacement of probe segments.

The foregoing and other objects and features of this invention will be clearly understood from a consideration of the detailed description thereof which follows when taken in conjunction with the accompanying drawings in which:

FIG. 7 illustrates an elevational view of the vertical support for the capacitance probe column;

FIG. 8 is a top plan view of the embodiment shown in FIG. 7; and

FIG. 9 is a cross-sectional view of the embodiment shown in FIG. 8 taken along lines 9—9.

Figure 1:
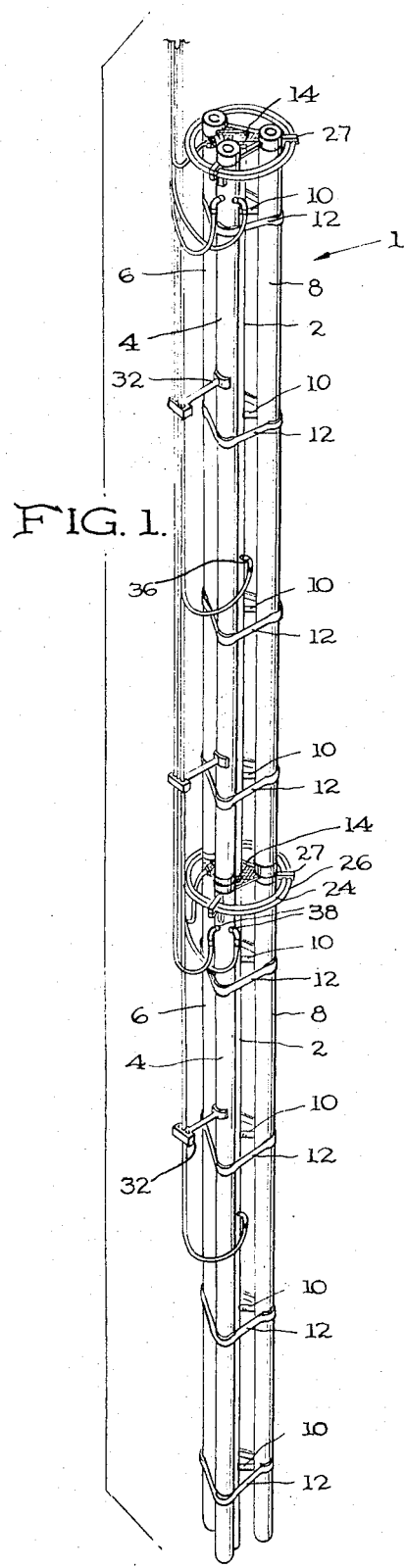
FIG. 1 is an elevational view illustrating the capacitance probe column according to the principles of this invention.
Figure 3:
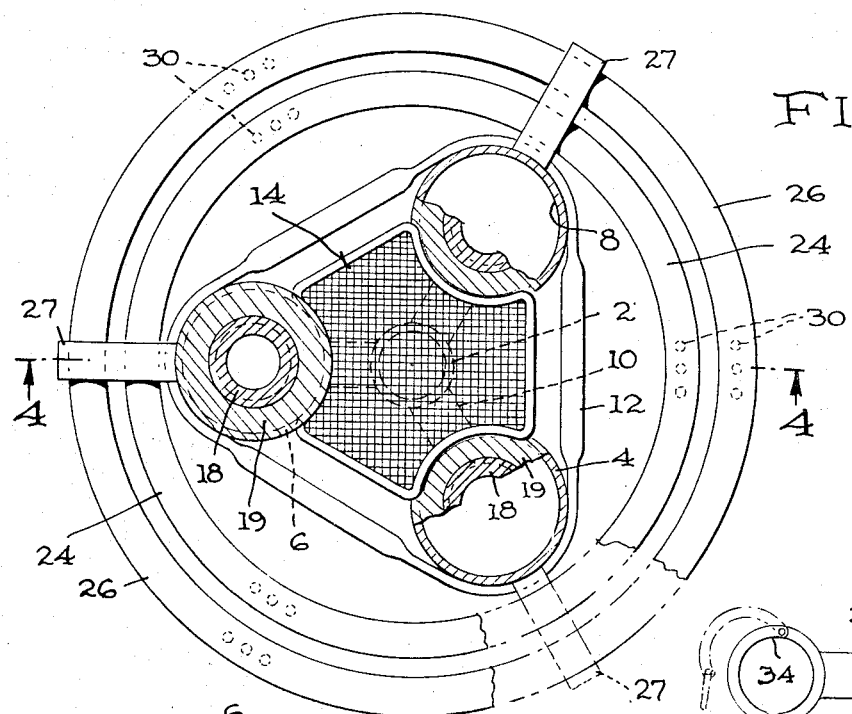
FIG. 3 is a horizontal cross section taken substantially along line 3—3 of FIG. 4.
Figure 4:
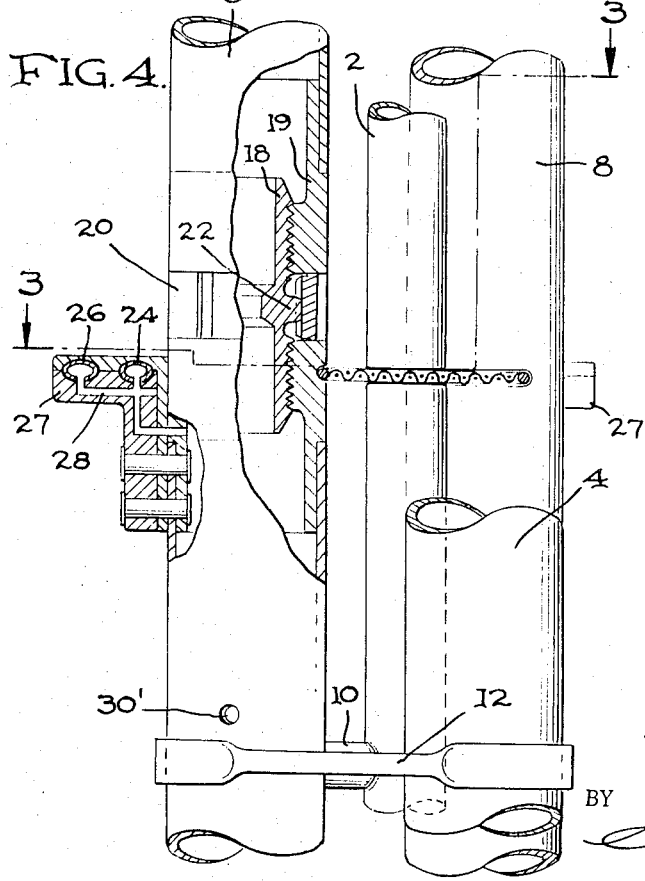
FIG. 4 is a fragmentary view partly in elevation and partly in cross section taken substantially along line 4—4 of FIG. 3.

In FIG. 1 there is shown a completed assembly 1 of two probe segments with the three outer continuous sensor electrodes 4, 6, 8 spaced at 120° angles around the inner electrode 2 and each connected thereto by spacers 10. The electrode tubes may be composed of stainless steel, aluminum or Invar. Preferably, Invar is utilized because of its low linear coefficient of expansion. Due to the fact that Invar is subject to rust formation, although it is liquid oxygen compatible, it is necessary to plate the Invar with a very thin coating of rhodium. The center electrode tube is mechanically restrained and electrically isolated by means of the radial Teflon spacer pins 10 contacting the outer electrodes, as best seen in FIGS. 3 and 4. The entire assembly is retained by Invar assembly straps 12 surrounding the outer electrodes. Four sets of spacers and assembly straps are provided for each segment as shown in FIG. 1. At initial assembly the radial Teflon pins 10 are compressed to a stress of about 2,000 p.s.i. corresponding to a 4% compression. Upon cooling to a liquid oxygen temperature, shrinkage will cause a loss of 2% compression leaving a residual loading of about 1,000 p.s.i. on the spacers. This will assure a tight assembly under liquid oxygen temperature conditions. The assembly straps 12 are made of ⅛ inch diameter rod flattened at the region of contact with the outer electrode and welded to each of these electrodes. In this construction the assembly straps provide partial compensation for the non-linearity of capacitance which results from the presence of the Teflon spacers 10 between the center and outer electrodes. If necessary, additional compensation can be readily provided to obtain a substantially true linear characteristic.

Figure 2:
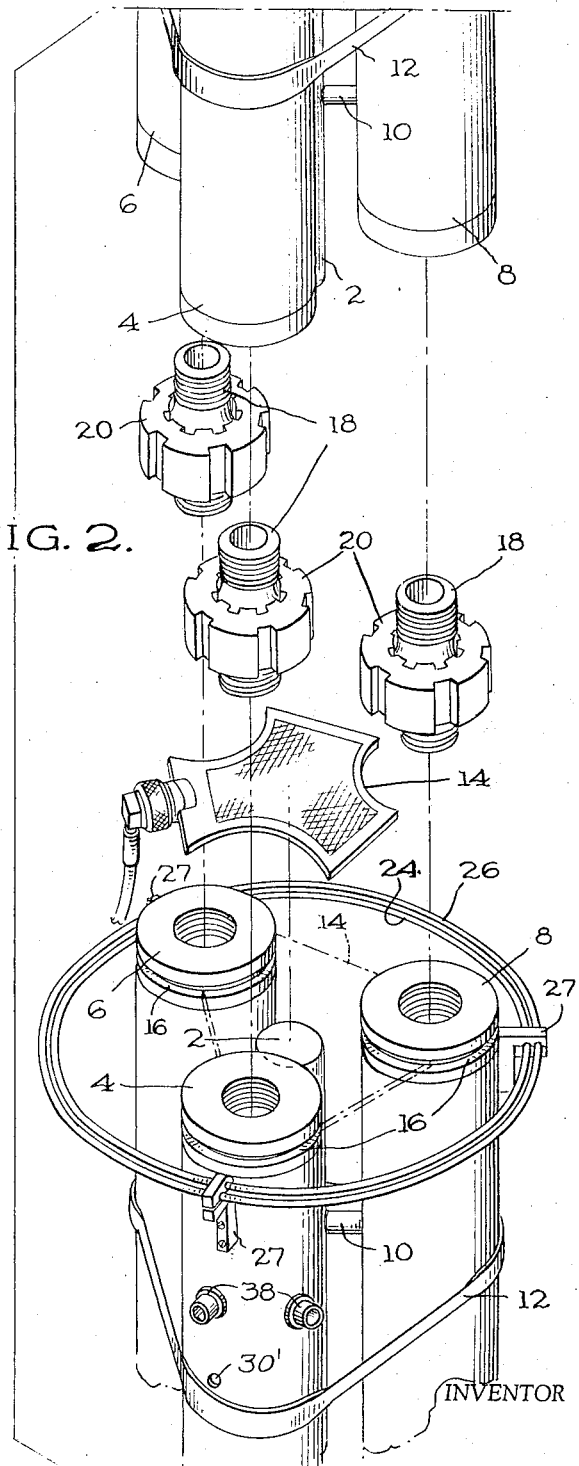
FIG. 2 is an exploded view on an enlarged scale of the inter-segment assembly shown in FIG. 1.

As shown in FIG. 2, the center electrode 2 in each segment is electrically isolated from all other electrodes by means of a Teflon coating at each end. Inter-segment electrostatic shields 14 are provided adjacent each end of the center electrode and are grounded by means of a common conductor. The shields 14 are made of wire screen material to offer minimum interference with propellant level changes. The edges of the shield are Teflon coated to prevent metallic contact with the outer electrodes. The shield associated with each segment is mechanically retained by grooves 16 in the outer electrode end caps.

As seen in FIGS. 2 and 4, the three outer electrodes are electrically and mechanically joined by individual threaded couplings 18 adapted to fit in a threaded sleeve 19 in each end of each of the outer electrodes 4, 6, 8. These couplings are made up of a center member having right and left hand threads at opposite ends and a collar 20 splined to a center section 22 so that it is free to slide axially for a limited distance and at the same time can be used to turn the threaded portion. The sliding axial fit of the collar will permit both segments to be drawn up tightly, thus securing accurate overall height control.

The point sensors attached to the upper end of each segment provide segment identification signals and periodic redundant measurement of liquid level. These are formed from a coplanar pair of concentric rings or electrodes 24, 26 which provide a step function impedance change when the liquid level passes their center plane. The point sensors are mounted by brackets 27 on each of the outer electrodes 4, 6, 8 with their center plane coplanar with the plane between segments.

All the electrodes are designed to substantially eliminate any temperature gradient in the submerged portion of the probe and also to maintain metal surfaces at cryogenic temperatures for an appreciable time after they have emerged from the liquid surface. This substantially eliminates bubbling at the sensor surfaces and also assures rapid response and true liquid level readings when sensor surfaces are resubmerged due to surface waves. This cooling is accomplished by making both the continuous and point sensors from hollow tubes which will be flooded with liquid oxygen when the tank is filled. By restricting the drainage through drain holes 30, 30' from these sensors, it is possible to keep the liquid oxygen level inside the sensors above the tank level and thereby insure cold sensor surfaces until such time as any possibility of re-submergence no longer exists. This action is illustrated in FIGS. 3 and 4 which show how a portion of the liquid oxygen drainage is constantly circulated through the bleeding passage 28 to the point sensor elements thereby providing effective cooling to the extended surfaces.

Figure 6:
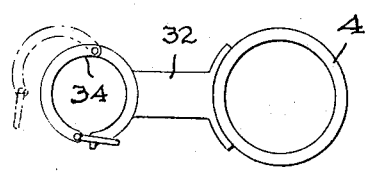
FIG. 6 is a top plan view of FIG. 5.
Figure 5:
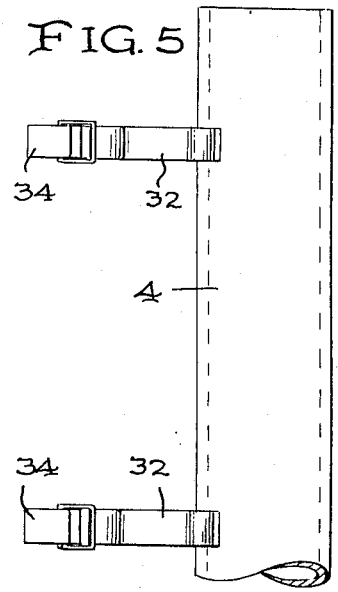
FIG. 5 is an enlarged elevational view illustrating the stand-off cable supports on an electrode column.

In FIGS. 5 and 6 there is shown the stand-off cable supports 32. It is necessary that the cable harness be quite independent of the probe assembly to allow for rapid removal and replacement of probe segments. It is also necessary because the design embodiment itself being symmetrical around the center electrode will not tolerate any conductors in the field between electrodes. The cable supports composed of Invar metal are welded to one of the three outer electrodes such as electrode 4 shown in FIG. 5. The spacing between the supports will be sufficient to rigidly hold the cable harness under the various vibration and shock environments anticipated, as well as under the wave action of the fluid under measurement. The supports are provided with a hinged quick disconnect clamp 34 to facilitate removal and replacement of probe segments.

As shown in FIG. 1, it is essential that the cable harness be maintained a suitable distance away from the outer extremities of the probe envelope, that is, the ring 26 made by the outer electrode of the point sensors. On the inside of the tank, not shown, at the top of the liquid oxygen tank and the bottom of the fuel tank are mounted coaxial, hermetically sealed, feed-through connectors, not shown. The cable harness is designed with quick disconnects, not shown, for the inside connection of the cable harness to the feed-through connectors. In this way the cable harness itself can also be quickly disconnected both from the probe assembly and from the feed-through connector going from the inside to the outside of either tank.

As shown in FIGS. 1 and 2, every probe segment is provided with three connectors, a connector 36 for the center electrode and two connectors 38 for the point sensor connections. These are quick disconnect connectors which are completely immune to accidental disconnect as well as severe vibration environments.

The end support for the probe column, as shown in FIGS. 7, 8 and 9, provides vertical support directly to the outer three electrodes 4, 6, 8, which are primary structural members. This is accomplished by providing special grooved coupling collars 40 at the lowest inter-segmented joint, as shown in FIG. 9. An attached bracket 42 is equipped with three pairs of angle plates 44, 45 which engage these grooves in a positive manner thereby providing both vertical and lateral restraint. The bracket fills the coupling collar in such a manner as to provide a flush electrode surface thereby maintaining the linearity of the capacitance sensor. In this way no special brackets or other fastenings need be welded to the sensors and all installation dimension adjustments are in the vehicle brackets and also sensor segments are truly interchangeable. Lateral support is provided by brackets 46, 48 extending from a T-shaped brace 49 and contoured to engage bracket 42 as shown in FIG. 8. Additional braces 51 may be provided for additional lateral support. The bracket structure is designed so that the tube-engaging surfaces are vertically off-set from the end which attaches to the tank baffles 50. If a point sensor is in the vicinity of the support point, it will always be possible to clear the sensor by utilizing the option of installing brackets with the offset surfaces either below or above the baffle attach point. The method shown in FIGS. 7–9 also has the advantage of preserving the open nature of the sensor construction in that there is only a minimal interference with exposure to the tank fluid level. Also, by keeping the engaging surface away from the center tube 2, the linear characteristics of the sensor is maintained.

The fact that the probe column must be approximately 50 feet long and self-supporting over its entire length under the extremes of vibration and shock anticipated calls for an extremely rigid mechanical structure. This problem is made more difficult by the fact that any relative change in position between the two electrodes making up the capacitor could lead to serious measurement error. Also, it is necessary in probe design that there be no significant variation due to any constructional details, especially at the joint between the segments that could lead to variation in capacitance over the height of the probe. With the present invention mechanical support for the entire probe structure is accomplished by the three outer electrodes, all electrically held at the same potential and running the height of the tank. One of the significant advantages stemming from the symmetrical spacing of the outer electrodes around the inner electrode is the relative insensitivity of this design to shift between the center electrode and any of the three outer electrodes. By this construction an open structure is realized with a maximum fluid level response.

Although only one embodiment of the invention has been depicted and described, it will be apparent that this embodiment is illustrative in nature and that a number of modifications in the apparatus and variations in its end use may be effected without departing from the spirit or scope of the invention as defined in the appended claims.

What I claim is:

1. In a capacitance probe column for measuring a rapidly changing liquid level, the combination of an elongated electrode column having an inner electrode tube and a plurality of outer electrode tubes equally spaced apart and spaced from said inner electrode tube, insulating means connecting said inner electrode tube with said outer electrode tube, point sensing means adjacent one end of said column comprising a pair of coaxial circular hollow electrode tubes, means for securing said circular tubes to said outer electrodes in a plane transverse to said column, said last named means comprising a passage connecting the interiors of said circular tubes with the interiors of said outer electrodes, whereby said liquid is caused to circulate between said outer electrode tubes and said circular tubes.

2. In a capacitance probe for measuring a rapidly changing liquid level, the combination of an elongated electrode column having an inner electrode tube and a plurality of outer electrode tubes equally spaced apart and spaced from said inner electrode tube, point sensing means adjacent one end of said column comprising a pair of coaxial circular hollow electrode tubes provided with a plurality of drainage holes, means for securing said circular tubes to said outer electrodes in a transverse plane with respect to said column, said last named means including a passage connecting the interior of said point sensing means to the interior of said outer electrode tubes whereby said liquid is caused to circulate between said outer electrode tubes and said circular tubes.

3. In a capacitance probe column for measuring a liquid level, the combination of an elongated electrode column having an inner electrode tube and a plurality of outer electrode tubes equally spaced apart and equally spaced from said inner electrode, capacitance point sensing means adjacent one end of said column wherein said last named means include means to maintain said point sensing means at the temperature of said liquid.

4. In a capacitance probe column for measuring a rapidly changing liquid column, the combination of an elongated inner electrode tube, a plurality of radially extending insulator spacer bars connecting said inner electrode tube with three equally spaced apart and circumferentially arranged outer electrode tubes and capacitance point sensing means adjacent one end of said column.

5. In a capacitance probe column for measuring a rapidly changing liquid level, the combination of a plurality of probe segments, wherein each segment comprises an elongated inner electrode tube and a plurality of equally spaced apart outer electrode tubes equally spaced from said inner electrode tube, means for mechanically joining said outer electrode tubes of said segments end to end and including means for shielding said inner electrode tube of one segment from a corresponding inner electrode tube in an adjacent one of said segments.

6. In the device according to claim 5, wherein said joining means comprises a plurality of threaded hollow coupling members and each end of said outer electrode tubes comprises a threaded sleeve whereby each of said members engages said threaded sleeve in a respective one of said outer electrode tubes.

7. In the device according to claim 5 further comprising a capacitance point sensing means at one end of each of said segments.

8. In a capacitance probe for measuring a rapidly changing liquid level, the combination of an elongated electrode column having an inner electrode tube and a plurality of outer electrode tubes equally spaced apart and equally spaced from said inner electrode, means for insulating said inner electrode from said outer electrodes, and capacitance point sensing means adjacent one end of said column.

References Cited

UNITED STATES PATENTS

| 1,672,856 | 6/1928 | Senkner | 317—253 |
| 2,945,165 | 7/1960 | Franzel | 317—246 |
| 2,982,895 | 5/1961 | Exon | 317—246 |
| 2,996,915 | 7/1961 | Greenwood et al. | 73—304 |
| 3,226,615 | 12/1965 | Nagel | 317—246 |

LOUIS R. PRINCE, *Primary Examiner.*

S. C. SWISHER, *Assistant Examiner.*